Oct. 19, 1943.  E. R. PRICE  2,332,340
POWER BRAKE
Filed Aug. 16, 1941  2 Sheets-Sheet 1

INVENTOR
EARL R. PRICE
BY
M. W. McConkey
ATTORNEY

Patented Oct. 19, 1943

2,332,340

UNITED STATES PATENT OFFICE 2,332,340

POWER BRAKE

Earl R. Price, South Bend, Ind., assignor to Bendix Aviation Corporation, South Bend, Ind., a corporation of Delaware Application August 16, 1941, Serial No. 407,117

5 Claims. (Cl. 188—152)

This invention relates to braking systems and particularly to hydraulic braking systems in which a power assistor is utilized to supplement the brake applying pressure which is created manually.

The device disclosed in this application is closely related to the device of my copending application, Serial No. 368,560, filed December 5, 1940. Both applications disclose brake systems in which a conventional hydraulic brake is combined with a power assistor which is operated according to the manually created pressure in the hydraulic brake and which, during its operation, adds its pressure creating effect to the pressure creating effect caused by the operator's manual exertion.

The conventional hydraulic brake system utilizes a check valve in the master or pressure-producing cylinder to maintain a certain pressure in the brake lines at all times, even though the brakes are released. Reasons for maintaining such a pressure in the brake lines include: (1) the desire to avoid drawing air into the wheel cylinders due to development of vacuum inside the wheel cylinders; and (2) the necessity to insure that the fluid in the brake lines will not return from wheel cylinder to master cylinder under the influence of gravity should the wheel cylinder temporarily be higher than the master cylinder.

In hydraulic brake systems which are operated in part by power, as the systems shown in this application and my copending application above referred to, it is customary to use the pressure created by the master cylinder piston for two purposes (1) to force fluid under pressure directly to the brakes to operate them, and (2) to force fluid to a control valve which operates the power assistor which in turn exerts pressure on the fluid operating the brakes. Obviously, the control valve must not operate the assistor until the operator desires to apply the brakes. If, then, the hydraulic fluid in the line connecting the master cylinder to the control valve is under a predetermined pressure even when the brakes are released, it will be necessary to provide a spring or other resilient means capable of holding the control valve in released or non-actuated position until the pressure in the master cylinder is increased above the predetermined normal line pressure. Not only must the spring be capable of holding the control valve in released position, but it must also be under an excess load sufficient to insure release of the valve after brake application regardless of the conditions maintaining.

It is an object of this invention to so connect the master cylinder of a power assisted hydraulic system to the control valve for actuating the assistor that the control valve will be connected to fluid from the master cylinder which is not under pressure (except atmospheric) while the brakes are released. This means that even though a pressure is maintained in the wheel cylinders at all times, the control valve will not require a spring strong enough to overcome such normal pressure. This also means that the control valve can be operated by a pressure less than the normal pressure in the hydraulic lines and therefore that even the smallest pressure created by the operator in the master cylinder behind the usual check valve will be effective to operate the control valve and to thereby start the operation of the power assistor.

An object of my device is to provide a vacuum power assisted hydraulic brake system in which the vacuum power assistor will begin to operate immediately upon the creation of pressure in the master cylinder so that the manual force necessary to get an appreciable braking effect will be light and the pedal "feel" will be exceptionally smooth.

A further object of my invention is to provide a power assisted hydraulic brake in which the control valve for the power assistor may incorporate a hydraulically actuated piston large enough so that pressure against it will quickly operate the valve. Where the valve must have a spring to keep the valve from operating under residual line pressure in the hydraulic system, it is necessary to increase the strength of the spring in the valve whenever the size of the hydraulic piston in the valve is increased. So long as this is true, increasing the size of the piston for the purpose of obtaining a lighter initial pedal pressure cannot have any advantageous effect except when less reaction or "feel" is desired.

Other objects and advantageous features of my invention will be apparent during the course of the following description.

Figure 1:
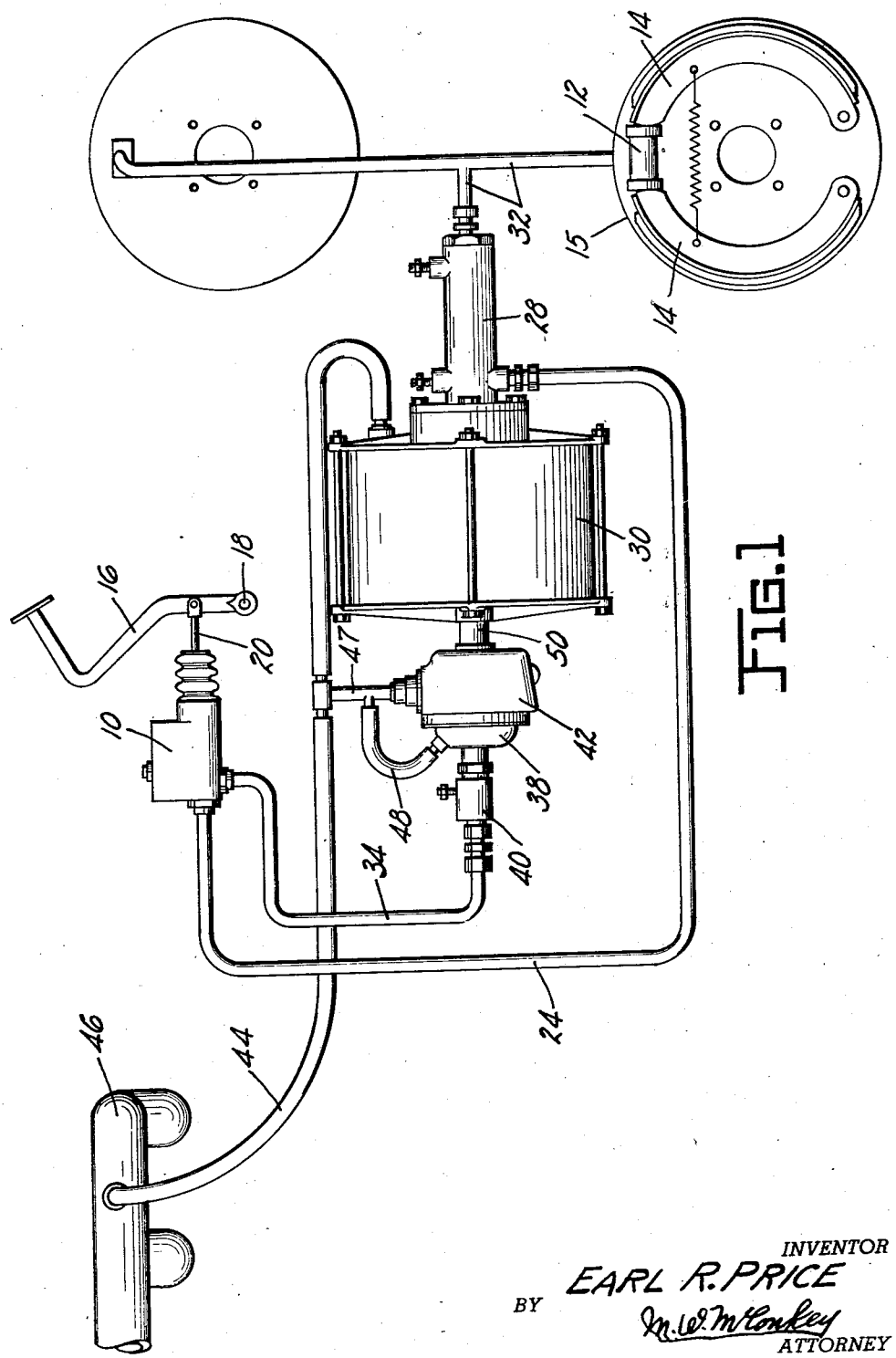
Figure 1 is a diagrammatic view of a power assisted hydraulic brake system incorporating my invention.

The brake illustrated diagrammatically in Figure 1 includes a conventional master cylinder 10 adapted to put liquid under pressure and a plurality of conventional wheel cylinders 12 adapted to move shoes 14 against brake drums 15 under the influence of the liquid under pressure. A manually operable pedal 16, pivoted at 18, has a rod 20 extending into the interior of the master cylinder 10 and contacting a piston 22 (see Figure 2), said rod and piston being arranged to put the liquid in the master cylinder under pressure in response to manual actuation of the pedal 16. A liquid carrying conduit 24 is connected to the master cylinder 10 at master cylinder outlet 26, and the said conduit 24 connects the master cylinder to an auxiliary hydraulic cylinder 28. Adjacent to and associated with the auxiliary cylinder 28 is a pneumatic or vacuum power cylinder 30. The outlet end of the auxiliary cylinder 28, i. e., the end farthest from the power cylinder 30, is connected by a liquid carrying conduit 32 and a plurality of branches thereof to the wheel cylinders 12.

A conduit 34 is connected to the master cylinder at master cylinder port 36. The conduit 34 leads from the said master cylinder outlet 36 to a control or relay valve indicated generally at 38. The control valve 38 comprises a hydraulic or control portion 40 and a pneumatic or controlled portion 42. A pneumatic or vacuum carrying line 44, extending from a source of vacuum, as for example, the usual intake manifold 46, is connected to the right side of the power cylinder 30, i. e., the side farthest from the relay valve 38. A branch 47 of the line 44 extends to one side of the relay or control valve 38 and a line 48 connects the branch line 47 to the left end of the said relay valve 38, the left end being the end farthest from the power cylinder 30. A pneumatic pressure carrying line 50 connects one end of the relay valve 38 to the left or near the end of the power cylinder 30.

Figure 2:
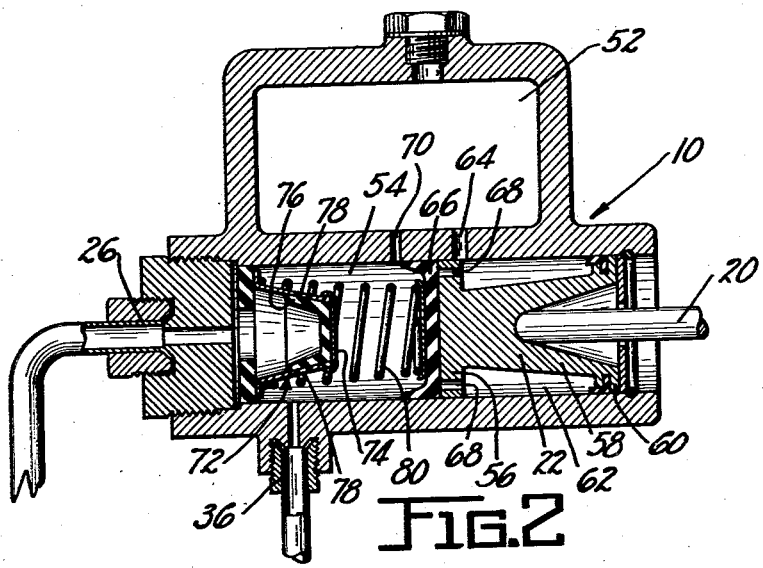
Figure 2 is a section taken on a vertical plane through the master cylinder of Figure 1.

Referring to Figure 2, it will be seen that the master cylinder 10 comprises a reservoir portion 52 and a cylinder or pressure portion 54. The piston 22 is reciprocable in the pressure or cylinder portion 54 and said piston comprises a head 56, a body portion 58 and a skirt or rear flange 60. The body portion is of smaller diameter than the head or skirt portions so that an annular chamber 62 is formed between the head and skirt of the piston. This chamber is normally connected by a port 64 to the reservoir 52. A sealing cup 66 rests against the head of the piston, and a plurality of ports 68 are provided through the head of the piston connecting the annular chamber 62 to the rear of the sealing cup 66. A compensating port 70 connecting the reservoir 52 to the cylinder 54 is positioned just ahead of the sealing cup 66 when the piston and cup are in brake released position.

A check valve 72 is provided adjacent the outlet 26 of the master cylinder. The check valve 72 comprises a casing 74, preferably metal, and a flexible inner portion 76 formed of rubber or like flexible material. A plurality of ports 78 open through the casing 74 to allow the fluid in cylinder 54 to flow against the outside edge or surface of the flexible member 76. A spring 80 serves the dual purpose of holding the check valve 72 against the left end of the master cylinder and of holding the sealing cup 66 in place on the piston 22.

The master cylinder construction including the check valve 72 is of conventional type, and its mode of operation will be readily understood. When the piston 22 is moved to the left, to force fluid from the master cylinder, the fluid passes through the ports 78 and past the edge of the flexible member 76 to the master cylinder outlet 26. When the piston 22 is retracted to release the brakes, fluid returning from the wheel cylinders will enter the master cylinder outlet 26 and push against the sides of the flexible member 76 tending to close the ports 78. Therefore, the returning fluid will have to overcome the force of the spring 80 before it can lift the casing 74 from its seat against the left end of the master cylinder and return to the cylinder 54 and reservoir 52. Thus the check valve 72 and spring 80 serve to maintain a light pressure in the hydraulic lines at all times, a pressure determined by the strength of the spring 80.

Figure 3:
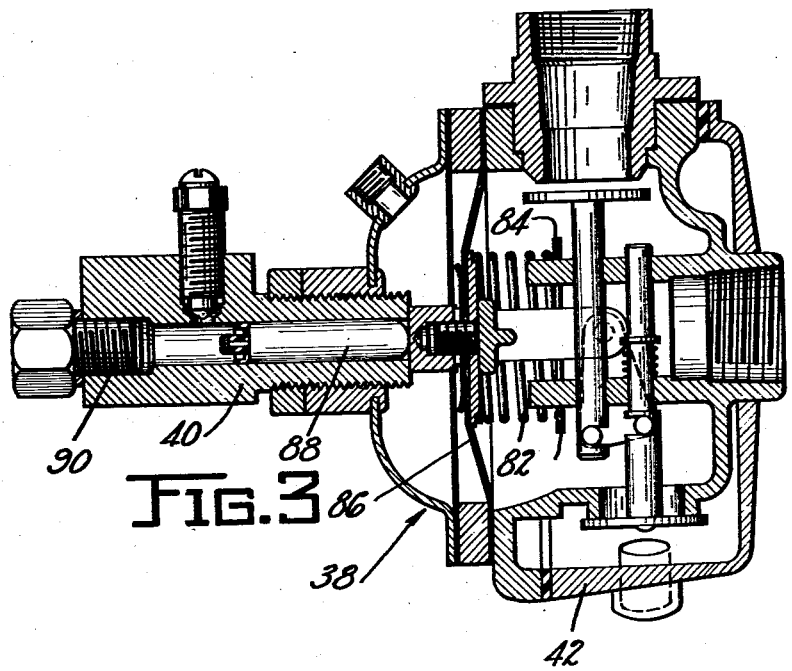
Figure 3 is a section on a vertical plane taken through the control valve of Figure 1.

As shown in Figure 3, the relay or control valve 38 includes the hydraulic portion 40 and the pneumatic or vacuum portion 42. As will be apparent from reference to my aforementioned copending application Serial No. 368,560, hydraulic pressure in the part 40 controls the part 42 in such manner that the power cylinder 30 is operated in accordance with operation of the master cylinder 10. Since operation of the valve 38 has been carefully described in my said copending application, it is not believed necessary to reiterate the description here. However, it may be pointed out that a spring 82 compressed between a ring 84 and a diaphragm 86 urges the diaphragm and thereby a hydraulic piston 88 toward the left to maintain the parts of control valve 38 in brake released position. When hydraulic pressure is created in the master cylinder fluid under pressure enters the valve portion 40 through inlet 90 and the said entering pressure is exerted against the left end of the piston 88 to move the piston to the right and actuate the pneumatic or vacuum portion 42 of the valve. Actuation of the said pneumatic portion 42 brings into operation the power or vacuum cylinder 30 to exert a force against a brake applying piston (not shown) in the auxiliary cylinder 28.

It will be noted that the inlet 90 of the valve portion 40 is connected by the conduit 34 to the master cylinder at the master cylinder outlet 36 which is on the reservoir side of the check valve 72. Thus the hydraulic fluid in the conduit 34 and therefore in the valve 38 is under only atmospheric pressure and is not subjected to the pressure which is maintained by the check valve 72 in the conduit 24 connected to the wheel cylinders. Because of the manner of connecting the valve 38 to the master cylinder 10, the release spring 82 of the valve need be only a light spring. If it is desired to make the hydraulic pressure more effective in opening the valve 38, the size of the piston 88 may be increased without necessity for also increasing the strength of the spring 82.

Operation of my device, in general, is as follows:

Fluid in the master cylinder 10 is normally capable of flowing through the conduit 24, the auxiliary cylinder 28 and the conduit 32 to enter the wheel cylinders 12 and apply the brakes. However, as soon as a pressure higher than reservoir or atmospheric pressure is created in the master cylinder 10, this pressure is transmitted through the liquid in conduit 34 to operate the piston in the valve 38 and actuate the said valve. Actuation of the valve 38 causes the creation of a pressure differential over a piston (not shown) in the cylinder 30 and this piston operates through a rod to increase the pressure of the fluid in the conduit 32 and at the same time to cut off the conduit 32 from the conduit 24. For details of operation of my device, it is suggested that reference be had to my copending application, Serial No. 368,560. Because the fluid in the conduit 34 begins to actuate the valve 38 immediately upon increase of the master cylinder pressure above reservoir pressure, the power cylinder 30 is brought into operation more quickly than was formerly the case. This means a smoother and easier pedal feel.

Although my invention has been described with reference to a single embodiment, it is intended that the following claims rather than the said embodiment be determinative of the scope of my invention.

I claim:

1. In combination, a master cylinder unit having a reservoir, an auxiliary cylinder, a conduit connecting the master cylinder to the auxiliary cylinder, means in the master cylinder for maintaining a predetermined pressure in the conduit, a motor cylinder connected to the auxiliary cylinder, a pneumatic power unit for exerting pressure on fluid in the auxiliary cylinder, a valve for controlling the power unit, and a conduit connecting the valve to the master cylinder on the reservoir side of the pressure maintaining means.

2. In combination, a master cylinder unit having a reservoir, an auxiliary cylinder, a conduit connecting the master cylinder to the auxiliary cylinder, a check valve in the master cylinder for maintaining a predetermined pressure in the conduit, a motor cylinder connected to the auxiliary cylinder, a pneumatic power unit for exerting pressure on fluid in the auxiliary cylinder, a valve for controlling the power unit, and a conduit connecting the valve to the master cylinder on the reservoir side of the pressure retaining means.

3. In a liquid pressure system having a reservoir, a motor operable by liquid-pressure, pressure producing means connected to the motor for placing the liquid under pressure, a check valve between the pressure producing means and the motor for maintaining the liquid in the motor under pressure, and a second motor operated by the pressure of liquid between the pressure producing means and the check valve, the liquid in said second motor being maintained at reservoir pressure until the pressure producing means is operated.

4. In a liquid pressure system, a motor operable by liquid-pressure, pressure producing means connected to the motor for placing the liquid under pressure, a check valve between the pressure producing means and the motor for maintaining the liquid in the motor under pressure, a second motor operated by the pressure of liquid between the pressure producing means and the check valve, and a power device controlled by the second motor and associated with the liquid connection between the pressure producing means and the first motor to enhance the pressure produced at the first motor by the pressure producing means.

5. A liquid pressure braking system comprising a primary master cylinder having an operator operated piston for creating pressure therein, a secondary master cylinder having an inlet port connected to the primary master cylinder to permit the flow of liquid under pressure from the primary master cylinder to the secondary master cylinder, a two-way valve between the primary master cylinder piston and the inlet port of the secondary master cylinder allowing a free flow of liquid from the primary master cylinder toward the secondary master cylinder but biased to maintain a slight residual pressure on the liquid in the secondary master cylinder, a wheel cylinder connected to the secondary master cylinder and actuated according to the liquid pressure in said secondary master cylinder, a differential air pressure power device for creating pressure in the secondary master cylinder to augment the pressure created therein by the primary master cylinder, valve means for controlling the differential air pressure power device, and a liquid pressure responsive motor which is connected to and responsive to the liquid pressure prevailing between the primary master cylinder piston and the two-way valve and which operates the aforesaid valve means.

EARL R. PRICE.